(12) United States Patent
Takahata et al.

(10) Patent No.: US 8,649,675 B2
(45) Date of Patent: Feb. 11, 2014

(54) INTERCHANGEABLE LENS AND CAMERA BODY

(75) Inventors: Junji Takahata, Osaka (JP); Takahiro Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/494,405

(22) Filed: Jun. 12, 2012

(65) Prior Publication Data

US 2013/0051780 A1 Feb. 28, 2013

(30) Foreign Application Priority Data

Aug. 23, 2011 (JP) ................................ 2011-181252

(51) Int. Cl.
| | | |
|---|---|---|
| G03B 17/00 | (2006.01) | |
| G03B 13/00 | (2006.01) | |
| H04N 5/262 | (2006.01) | |
| G02B 15/14 | (2006.01) | |
| G02B 7/02 | (2006.01) | |

(52) U.S. Cl.
USPC ............... 396/85; 396/50; 396/79; 396/529; 348/240.3; 348/345; 359/701; 359/825; 359/827

(58) Field of Classification Search
USPC ............ 396/85, 50, 79, 86, 87, 529–533; 348/240.99, 240.3, 345, 375; 359/676, 359/701, 819, 823, 825, 827–830
See application file for complete search history.

(56) References Cited

U.S. PATENT DOCUMENTS

| | | | |
|---|---|---|---|
| 6,035,137 A | 3/2000 | Kaneko et al. | |
| 6,963,366 B2 | 11/2005 | Okawara | |
| 2010/0129068 A1* | 5/2010 | Binda et al. | 396/50 |
| 2010/0238321 A1 | 9/2010 | Honjo et al. | |

FOREIGN PATENT DOCUMENTS

| | | |
|---|---|---|
| JP | 10-010407 | 1/1998 |
| JP | 11-160604 | 6/1999 |
| JP | 2001-281524 | 10/2001 |
| WO | 2009/041063 | 4/2009 |

* cited by examiner

*Primary Examiner* — Rochelle-Ann J Blackman
(74) *Attorney, Agent, or Firm* — Panasonic Patent Center

(57) ABSTRACT

An interchangeable lens mountable to a camera body includes a zoom lens configured to adjust an angle of view of a subject image, a driver configured to move the zoom lens in an optical axis direction, a plurality of operating members configured to generate an operation signal for driving the driver according to operation performed by a user, a communication unit configured to receive, from the camera body, setting information for setting valid/invalid of at least one of the plurality of operating members, and a controller configured to control the driver. The controller drives and does not drive the driver based on the operation signal from the operating member having been set to valid and invalid, respectively, by the setting information received through the communication unit.

14 Claims, 7 Drawing Sheets

INTERCHANGEABLE LENS AND CAMERA BODY

BACKGROUND

1. Technical Field

The technical field relates to an interchangeable lens including a plurality of operating units configured to operate an optical member, and a camera body to which the interchangeable lens is mountable.

2. Related Art

A conventional interchangeable lens unit adopts a mechanism for mechanically driving an optical system such as a focus lens and a zoom lens. On the other hand, in recent years, there has been proposed a digital camera which drives an optical system by an electric actuator such as a motor (see, for example, WO 2009/041063). This conventional interchangeable lens unit can adjust zoom magnification.

In a digital camera to which an interchangeable lens primarily used for shooting still images (photos) is mountable, a ring-shaped rotation operating member (a so-called zoom ring) is provided around a lens barrel of the interchangeable lens in order to adjust zoom magnification. When a user rotates the zoom ring, the zoom magnification changes according to the amount of rotation of the zoom ring, and thus, the user can intuitively obtain a desired zoom magnification.

Meanwhile, in a video camera primarily used for shooting moving images, a switch type operating member (a so-called zoom lever) such as a lever or a button is provided in order to adjust zoom magnification. In such a video camera, the zoom magnification changes at a constant speed by the motorized zoom in which an actuator drives a zoom lens according to the on/off operation of the operating member. Therefore, a user can continuously change the zoom magnification at a constant speed.

A digital camera which includes an interchangeable lens and can shoot both moving images and still images becomes widely used in recent years. Such an interchangeable lens is considered to include both a zoom ring and a zoom lever as operating members for adjusting zoom magnification. However, using a digital camera to which an interchangeable lens including both a zoom ring and a zoom lever is mounted may cause occurrence of erroneous operation. For example, if, during operation of one of such operating members (e.g., the zoom lever), a user touches the other operating member (e.g., the zoom ring) at an unintentional timing, then the zoom magnification changes by the zoom ring and thus the user cannot adjust the zoom magnification as intended. Thus, when a plurality of operating members are provided on a digital camera, usability in terms of zoom magnification setting may not be good for a user of the camera.

SUMMARY

In view of the above-described problem, an object is to provide an interchangeable lens and a camera body which implement a camera system providing a user of the camera with excellent usability in terms of zoom operation of the interchangeable lens including a plurality of operating members.

To solve the above-described problem, in a first aspect, an interchangeable lens mountable to a camera body includes: a zoom lens configured to adjust an angle of view of a subject image; a driver configured to move the zoom lens in an optical axis direction; a plurality of operating members configured to generate an operation signal for driving the driver according to operation performed by a user; a communication unit configured to receive, from the camera body, setting information for setting valid/invalid of at least one of the plurality of operating members; and a controller configured to control the driver. The controller drives the driver based on the operation signal from the operating member having been set to valid by the setting information received through the communication unit, and does not drive the driver based on the operation signal from the operating member having been set to invalid by the received setting information.

To solve the above-described problem, in a second aspect, a camera body to which an interchangeable lens including a plurality of operating members configured to drive a zoom lens is mountable, includes: an imaging unit configured to capture a subject image inputted through the interchangeable lens to generate image data; a setting unit configured to set setting information for setting valid/invalid of at least one of the plurality of operating members of the interchangeable lens; and a communication unit configured to send the setting information to the interchangeable lens.

According to the above aspects, the camera body sets setting information for setting valid/invalid state of at least one operating member (e.g., a zoom ring) among a plurality of operating members (e.g., a zoom ring and a zoom lever) based on user's operation, and the interchangeable lens controls the driver for the zoom lens based on the setting information. By this, for example, when a user wants to adjust zoom magnification by operating the zoom lever, by setting the zoom ring to invalid, the zoom magnification can be prevented from being unintentionally changed due to the user accidentally touching the zoom ring. Thus, an interchangeable lens operable to set the zoom magnification with excellent usability for a user, and a camera body to which the interchangeable lens is mountable can be implemented.

BRIEF DESCRIPTION OF DRAWINGS

FIG. 4A is a diagram showing an exemplary display screen at shooting mode, FIG. 4B is a diagram showing an exemplary display of a menu setting screen, FIG. 4C is a diagram showing an exemplary display of a detailed motorized zoom settings screen, and FIG. 4D is a diagram showing an exemplary display screen at zoom operating mode.

DETAILED DESCRIPTION OF PREFERRED EMBODIMENTS

First Embodiment

In a digital camera of a first embodiment, an interchangeable lens includes a plurality of operating members (specifically, a zoom ring and a zoom lever) for driving a zoom lens. A camera body sets setting information for indicating a valid/invalid state of at least one operating member (in the present embodiment, the zoom ring) among the plurality of operating members of the interchangeable lens, based on user's operation, and the interchangeable lens controls a zoom lens driver based on the setting information. By this, the zoom ring can be set to invalid. For example, when a user wants to adjust zoom magnification by operating the zoom lever, the zoom magnification can be prevented from being unintentionally changed due to the user accidentally touching the zoom ring. Thus, according to the present embodiment, an interchangeable lens with improved user usability in terms of zoom magnification setting and a camera body to which the interchangeable lens is mountable can be implemented.

1. Configuration

1-1. Configuration Overview

An overview of a configuration of a digital camera of the first embodiment will be described.

Figure 1:
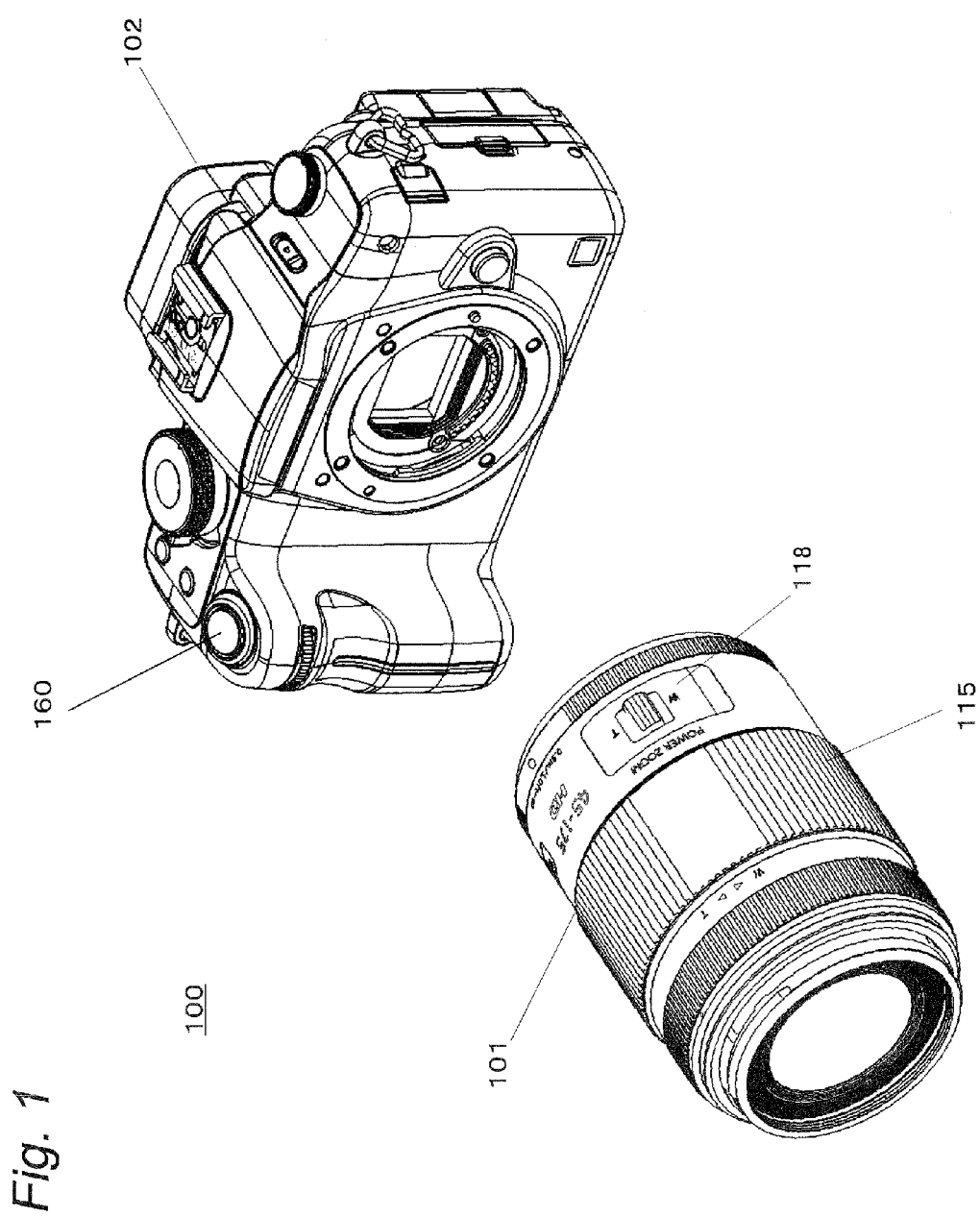
FIG. 1 is an external view of a digital camera of a first embodiment.

FIG. 1 is an external view of a digital camera 100 of the first embodiment. As shown in FIG. 1, the digital camera 100 includes a motorized interchangeable lens 101 and a camera body 102 to which the motorized interchangeable lens 101 is mountable. The motorized interchangeable lens 101 is an interchangeable lens configured to change zoom magnification by controlling a zoom lens driver (e.g., an actuator) according to operation performed by a user. The motorized interchangeable lens 101 includes both a zoom ring 115 and a zoom lever 118 as operating members for controlling the zoom lens driver. When the zoom ring 115 is operated by the user, the motorized interchangeable lens 101 performs control of a zoom lens by driving the zoom lens driver according to the operation of the zoom ring 115. In addition, when the zoom lever 118 is operated by the user, the motorized interchangeable lens 101 performs control of the zoom lens by driving the zoom lens driver according to the operation of the zoom lever 118.

The camera body 102 includes a release button 160. When the camera body 102 accepts operation of the release button 160 performed by the user, the camera body 102 can notify the motorized interchangeable lens 101 of a control signal to perform autofocus operation or can perform shooting operation of a subject image formed through the motorized interchangeable lens 101.

Figure 2:
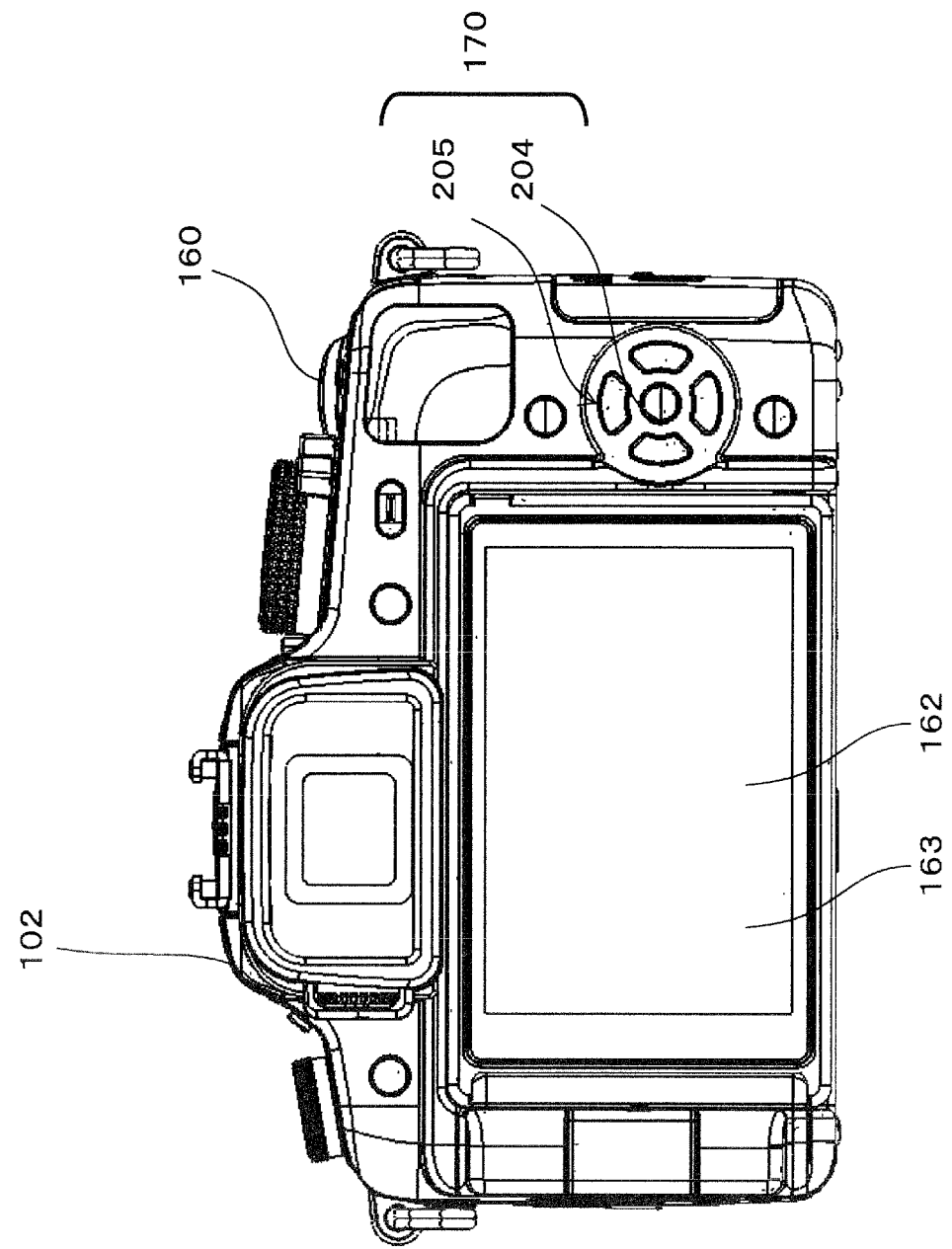
FIG. 2 is a rear view of the digital camera of the first embodiment.

FIG. 2 is a rear view of the digital camera 100 (the camera body 102). The camera body 102 includes, at its rear portion, a liquid crystal monitor 163, a touch panel 162, a camera-side operating unit 170 (including a center button 204 and a cross button 205), and the like. The camera body 102 accepts an operation performed by the user on the touch panel 162 and the camera-side operating unit 170 and performs various controls according to the contents of the operation.

Figure 3:
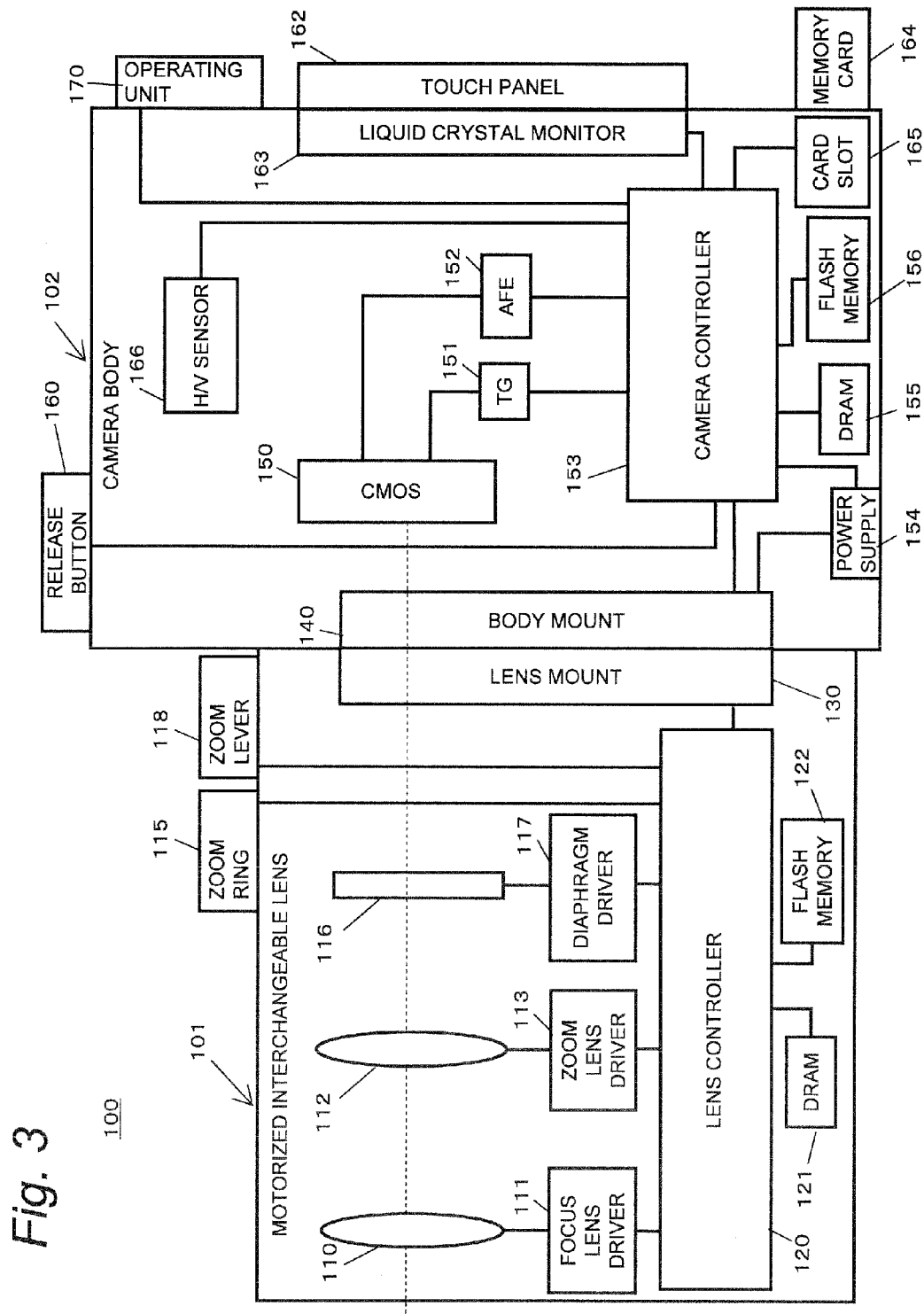
FIG. 3 is an electrical configuration diagram of the digital camera of the first embodiment.

FIG. 3 is a diagram showing an electrical configuration of the digital camera 100 (the motorized interchangeable lens 101 and the camera body 102). The motorized interchangeable lens 101 includes a lens controller 120, a lens mount 130, an optical system including a focus lens 110 and a zoom lens 112, a focus lens driver 111, a zoom lens driver 113, a diaphragm 116, a diaphragm driver 117, the zoom ring 115, the zoom lever 118, a DRAM 121, a flash memory 122, and the like. The camera body 102 includes a camera controller 153, a body mount 140, a CMOS image sensor 150, a timing generator (TG) 151, an analog front end (AFE) 152, the liquid crystal monitor 163, the touch panel 162, the release button 160, the camera-side operating unit 170, a power supply 154, a DRAM 155, a flash memory 156, a card slot 165, a memory card 164, and a horizontal and vertical sensor 166.

1-2. Configuration of Each Component of Motorized Interchangeable Lens

A configuration of each component of the motorized interchangeable lens 101 will be described.

The lens controller 120 controls the entire motorized interchangeable lens 101. When the lens controller 120 accepts operation of the zoom ring 115 by a user, the lens controller 120 controls the zoom lens driver 113 to drive the zoom lens 112. In addition, when the lens controller 120 accepts operation of the zoom lever 118 by the user, the lens controller 120 controls the zoom lens driver 113 to drive the zoom lens 112. The lens controller 120 is connected to the DRAM 121 and the flash memory 122 and can write or read information to/from the DRAM 121 and the flash memory 122 as necessary. In addition, the lens controller 120 can communicate with the camera controller 153 through the lens mount 130. Note that the lens controller 120 may include a hard-wired electronic circuit or may include a microcomputer using a program, and the like.

The lens mount 130 is a connecting member for mechanically and electrically connecting, together with the body mount 140 included in the camera body 102, the motorized interchangeable lens 101 to the camera body 102. When the motorized interchangeable lens 101 and the camera body 102 are mechanically and electrically connected, the lens controller 120 and the camera controller 153 go into a communicable state.

The DRAM 121 is used as a working memory when performing various controls by the lens controller 120. The flash memory 122 stores a program, parameters, lens data, and the like, which are used when various controls are performed by the lens controller 120. In the present embodiment, when zoom ring operation setting information indicating a zoom ring operation acceptance allowed/not allowed setting state (i.e., the valid/invalid of operation of the zoom ring 115) is sent to the motorized interchangeable lens 101 from the camera body 102, the zoom ring operation setting information is stored in the flash memory 122.

The focus lens 110 is a lens for changing the focus state of a subject image which is incident on the optical system of the motorized interchangeable lens 101 and formed on the CMOS image sensor 150. The lenses included in the focus lens 110 may be any in number and of any group. The focus lens driver 111 drives the focus lens 110 to move back and forth along an optical axis of the optical system, based on a control signal notified from the lens controller 120. Note that the focus lens driver 111 can be implemented by, for example, a stepping motor, a DC motor, or an ultrasonic motor.

The zoom lens 112 is a lens for changing the magnification of a subject image formed by the optical system of the motorized interchangeable lens 101. The lenses included in the zoom lens 112 may be any in number and of any group. The zoom lens driver 113 drives the zoom lens 112 to move back and forth along the optical axis of the optical system, based on a control signal notified from the lens controller 120. Note that the zoom lens driver 113 can be implemented by, for example, a stepping motor, a DC motor, or an ultrasonic motor.

The diaphragm 116 is composed of a plurality of mechanical blades such that they can be opened and closed. The diaphragm 116 is a regulating member capable of regulating the amount of light entering the optical system of the motorized interchangeable lens 101. The diaphragm driver 117 changes the open/closed state of the mechanical blades of the diaphragm 116, based on a control signal notified from the lens controller 120. Note that the diaphragm driver 117 can be implemented by, for example, a stepping motor, a DC motor, or an ultrasonic motor.

The zoom ring 115 is an operating member provided on the exterior of the motorized interchangeable lens 101. The zoom ring 115 is configured to rotate relative to the motorized interchangeable lens 101. The rotation position and rotation speed of the zoom ring 115 are detected by a detector (not shown) and notified to the lens controller 120. The lens controller 120 supplies a drive control signal (zoom control signal) to the zoom lens driver 113, based on the notified rotation position and rotation speed of the zoom ring 115.

The zoom lever 118 is an operating member provided on the exterior of the motorized interchangeable lens 101. As one example, the zoom lever 118 may be a three-position toggle switch (SW). When the lens controller 120 detects that the zoom lever 118 has been moved, the lens controller 120 supplies a drive control signal (zoom control signal) to the zoom lens driver 113, based on a direction in which the zoom lever 118 has been moved. In this case, the zoom control signal is a signal instructing the zoom lens driver 113 to drive the zoom lens 112 at the maximum speed in a drivable range, and allows to perform drive at a constant speed compared to a zoom control signal generated based on operation of the zoom ring 115.

Note that the lens controller 120 may detect a direction and an angle in/at which the zoom lever 118 has been moved, and impose a speed limit on the zoom lens driver 113 based on the detected direction and angle. In this case, the zoom magnification changes at a constant speed which is determined by the direction and angle in/at which the zoom lever 118 has been moved.

1-3. Configuration of Each Component of Camera Body

A configuration of each component of the camera body 102 will be described.

The camera controller 153 controls the entire digital camera 100 (e.g., the CMOS image sensor 150 and the like) according to instructions from the release button 160 and the camera-side operating unit 170. The camera controller 153 notifies the timing generator (TG) 151 of a vertical synchronizing signal. In parallel with this, the camera controller 153 generates an exposure synchronizing signal, based on the vertical synchronizing signal. The camera controller 153 periodically and repeatedly notifies the lens controller 120 of the generated exposure synchronizing signal through the body mount 140 and the lens mount 130. The camera controller 153 is connected to the DRAM 155 and the flash memory 156 and can write or read information to/from the DRAM 155 and the flash memory 156 as necessary. The camera controller 153 may include a hard-wired electronic circuit or may include a microcomputer using a program, and the like.

The DRAM 155 is used as a working memory when performing various controls by the camera controller 153. The flash memory 156 stores a program, parameters, and the like, which are used when various controls are performed by the camera controller 153. In the present embodiment, the flash memory 156 stores zoom ring operation setting information indicating a zoom ring operation acceptance allowed/not allowed setting state (i.e., the valid/invalid of operation of the zoom ring 115).

The CMOS image sensor 150 captures a subject image incident thereon through the motorized interchangeable lens 101 and thereby generates image information. The AFE 152 converts the image information generated by the CMOS image sensor 150 from data in analog form to data in digital form. The camera controller 153 performs various types of image processing on the image information digitized by the AFE 152. The various types of image processing as used herein include, for example, a gamma correction process, a white balance correction process, a flaw correction process, a YC conversion process, an electronic zoom process, and a JPEG compression process, but are not limited thereto. In addition, instead of the CMOS image sensor 150, other imaging devices, e.g., an NMOS image sensor and a CCD image sensor, can also be used.

The CMOS image sensor 150 operates at timing which is controlled by the TG 151. The operations of the CMOS image sensor 150 controlled by the TG 151 include a still image capturing operation, a through image capturing operation, a data transfer operation, an electronic shutter operation, and the like. A through image is mainly a moving image and is displayed on the liquid crystal monitor 163 in order to determine a composition for capturing a still image.

The liquid crystal monitor 163 is disposed at the rear of the camera body 102 and displays an image represented by image information for display processed by the camera controller 153. The liquid crystal monitor 163 can selectively display both a moving image and a still image. In addition to images, the liquid crystal monitor 163 can display setting conditions of the entire digital camera 100 and the like. Although, in the present embodiment, the liquid crystal monitor 163 is provided as an example of a display unit, other display units such as an organic EL display may be used.

The touch panel 162 is provided on a surface of the liquid crystal monitor 163, and generates information about an electrode position on the touch panel 162 touched by the user. The touch panel 162 calculates, based on the information about the electrode position, the coordinates of a position on the touch panel 162 touched by the user and notifies the camera controller 153 of the coordinates of the position.

The body mount 140 is a connecting member for mechanically and electrically connecting, together with the lens mount 130 included in the motorized interchangeable lens 101, the motorized interchangeable lens 101 to the camera body 102. When the motorized interchangeable lens 101 and the camera body 102 are mechanically and electrically connected, the lens controller 120 and the camera controller 153 go into a communicable state. The body mount 140 notifies the lens controller 120 of an exposure synchronizing signal and other control signals which are received from the camera controller 153, through the lens mount 130. In addition, the body mount 140 notifies the camera controller 153 of a signal received from the lens controller 120 through the lens mount 130.

The power supply 154 supplies power to be consumed by the digital camera 100. The power supply 154 may be, for example, a dry battery or a rechargeable battery. Alternatively, the power supply 154 may supply power supplied from an external source through a power cord, to the digital camera 100. When the power supply 154 is turned on, the camera controller 153 supplies power to the entire camera body 102. In addition, the camera controller 153 supplies power to the motorized interchangeable lens 101 through the body mount 140 and the lens mount 130. The lens controller 120 supplies power to the entire motorized interchangeable lens 101.

The card slot 165 is a connector which can allow the memory card 164 to be inserted thereinto and removed therefrom. The card slot 165 can connect the memory card 164 electrically and mechanically. Note that the card slot 165 may have the function of controlling the memory card 164.

The memory card 164 is an external memory including therein a storage unit such as a flash memory. The memory card 164 can store data such as image information processed by the camera controller 153. In addition, the memory card 164 can output data such as image information stored therein. The image information outputted from the memory card 164 is processed by the camera controller 153 and is played back and displayed on, for example, the liquid crystal monitor 163.

The release button 160 accepts a user's operation. The release button 160 can accept two-level, half press and full press operations. By the user performing the half-press operation on the release button 160, the camera controller 153 performs autofocus operation. In addition, by the user performing the full-press operation on the release button 160, the camera controller 153 stores image information generated according to the timing of the full-press operation, in the memory card 164.

The camera-side operating unit 170 is a generic term for operating members including the aforementioned center button 204 and cross button 205. The camera-side operating unit 170 may includes a switch which switches between MF (manual focus) and AF (autofocus). When the camera-side operating unit 170 accepts operation performed by the user, the camera controller 153 performs various controls according to the content of an instruction based on the operation performed by the user.

The horizontal and vertical sensor 166 detects whether the orientation of the camera body 102 is a vertical orientation or a horizontal orientation (an erect state). The horizontal and vertical sensor 166 sends the detected orientation to the camera controller 153.

1-4. Valid/Invalid Setting for Zoom Ring

The zoom setting mode of the motorized interchangeable lens 101 will be described. FIGS. 4A to 4D are diagrams showing exemplary displays on the liquid crystal monitor 163 of the camera body 102.

Figure 4A:
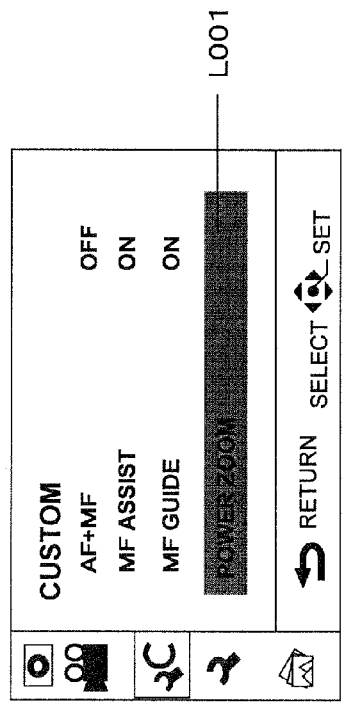
FIGS. 4A, 4B, 4C and 4D are diagrams showing examples of display screen on a liquid crystal monitor of a camera body in the first embodiment.

FIG. 4A is a diagram showing an example of display screen in a normal state of the liquid crystal monitor 163 when the digital camera 100 is set to a shooting mode for shooting an image.

Figure 4B:
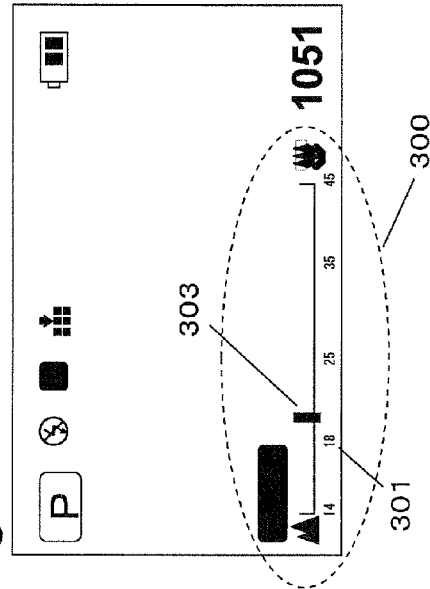

When the user performs various settings of the digital camera 100, the user presses the center button 204 of the camera body 102. When the camera controller 153 detects the pressing of the center button 204, the camera controller 153 switches the display content on the liquid crystal monitor 163 from the display screen shown in FIG. 4A to the display screen shown in FIG. 4B. FIG. 4B shows an example of a display of a menu setting screen on which various settings of the digital camera 100 can be changed. On the menu setting screen, the user can set, for example, the focus mode to autofocus mode or manual focus mode.

When the motorized interchangeable lens 101 is mounted to the camera body 102, a motorized zoom setting item L001 which is displayed as "power zoom" is displayed on the menu setting screen shown in FIG. 4B. Specifically, when a motorized interchangeable lens which changes zoom magnification by controlling the zoom lens driver 113 according to operation performed by the user, such as the motorized interchangeable lens 101 of the present embodiment, is mounted to the camera body 102, the camera controller 153 detects the mounted state and displays the motorized zoom setting item L001. On the other hand, when a different interchangeable lens from such a motorized interchangeable lens is mounted, the motorized zoom setting item L001 is not displayed.

Figure 4C:
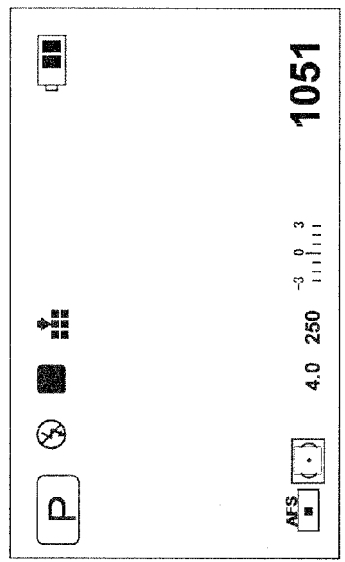

When the motorized zoom setting item L001 is selected by the user operating the camera-side operating unit 170 or the touch panel 162, the camera controller 153 changes the display content on the liquid crystal monitor 163 from the display screen shown in FIG. 4B to the display screen shown in FIG. 4C where detailed settings for motorized zoom can be performed. On the detailed motorized zoom settings screen shown in FIG. 4C, the camera controller 153 displays a zoom ring operation setting item L002 for setting whether to invalidate or validate operation of the zoom ring 115 of the motorized interchangeable lens 101. At this time, the camera controller 153 reads zoom ring operation setting information stored in the flash memory 156, and displays on/off of the zoom ring operation setting item L002 based on the read zoom ring operation setting information. The zoom ring operation setting information indicates whether to validate or invalidate operation of the zoom ring 115 performed by the user, and takes either value, "on" or "off". FIG. 4C shows exemplary display provided when the zoom ring operation setting information is "off".

When the zoom ring operation setting item L002 is selected by the user operating the camera-side operating unit 170 or the touch panel 162, the camera controller 153 switches the zoom ring operation acceptance allowed/not allowed setting state. Specifically, when the zoom ring operation acceptance allowed/not allowed setting state is "on", the state is changed to "off", and when the state is "off", the state is changed to "on". Along with this change, the camera controller 153 stores zoom ring operation setting information indicating the changed zoom ring operation acceptance allowed/not allowed setting state, in the flash memory 156, and notifies the motorized interchangeable lens 101 of the zoom ring operation setting information. As such, the user can select whether to invalidate or validate operation of the zoom ring 115 of the motorized interchangeable lens 101, by performing the setting of switching as to whether to allow zoom ring operation acceptance.

Figure 4D:
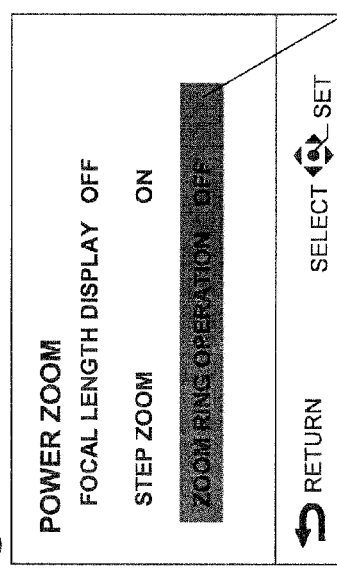

FIG. 4D is a diagram showing an exemplary display provided upon zoom operation. When the zoom lens 112 is driven by operating the zoom ring 115 or the zoom lever 118, zoom focal length information 300 indicating a zoom focal length is displayed as shown in FIG. 4D. In FIG. 4D, in order for the user to recognize the currently set motorized zoom magnification, the zoom focal length information 300 including a focal length scale 301 and an index 303 indicating the current zoom focal length is displayed.

2. Operation 2-1. Operation Overview

An overview of the operation of the digital camera 100 of the first embodiment will be described. When the power supply 154 to the camera body 102 is switched to an ON state by the user operating a power switch (not shown) of the camera body 102 with the motorized interchangeable lens 101 mounted to the camera body 102, power supply and various initial settings are performed.

The camera body 102 reads the zoom ring operation setting information stored in the flash memory 156 and sends the zoom ring operation setting information to the motorized interchangeable lens 101. The motorized interchangeable lens 101 mounted to the camera body 102 determines whether to validate or invalidate operation to be performed on the zoom ring 115, according to the zoom ring operation setting information obtained from the camera body 102.

The user of the digital camera 100 can set whether to allow acceptance of operation of the zoom ring 115 of the motorized interchangeable lens 101, by operation performed on the camera-side operating unit 170 or touch panel 162 of the camera body 102. When the setting of switching as to whether to allow acceptance of operation of the zoom ring 115 is performed by operation of the camera body 102, the camera body 102 sends zoom ring operation setting information to the motorized interchangeable lens 101. The motorized interchangeable lens 101 switches whether to validate or invalidate operation of the zoom ring 115, according to the information from the camera body 102.

The initial operation and zoom operation of the motorized interchangeable lens 101 and the camera body 102 will be described in detail below step by step.

Figure 5:
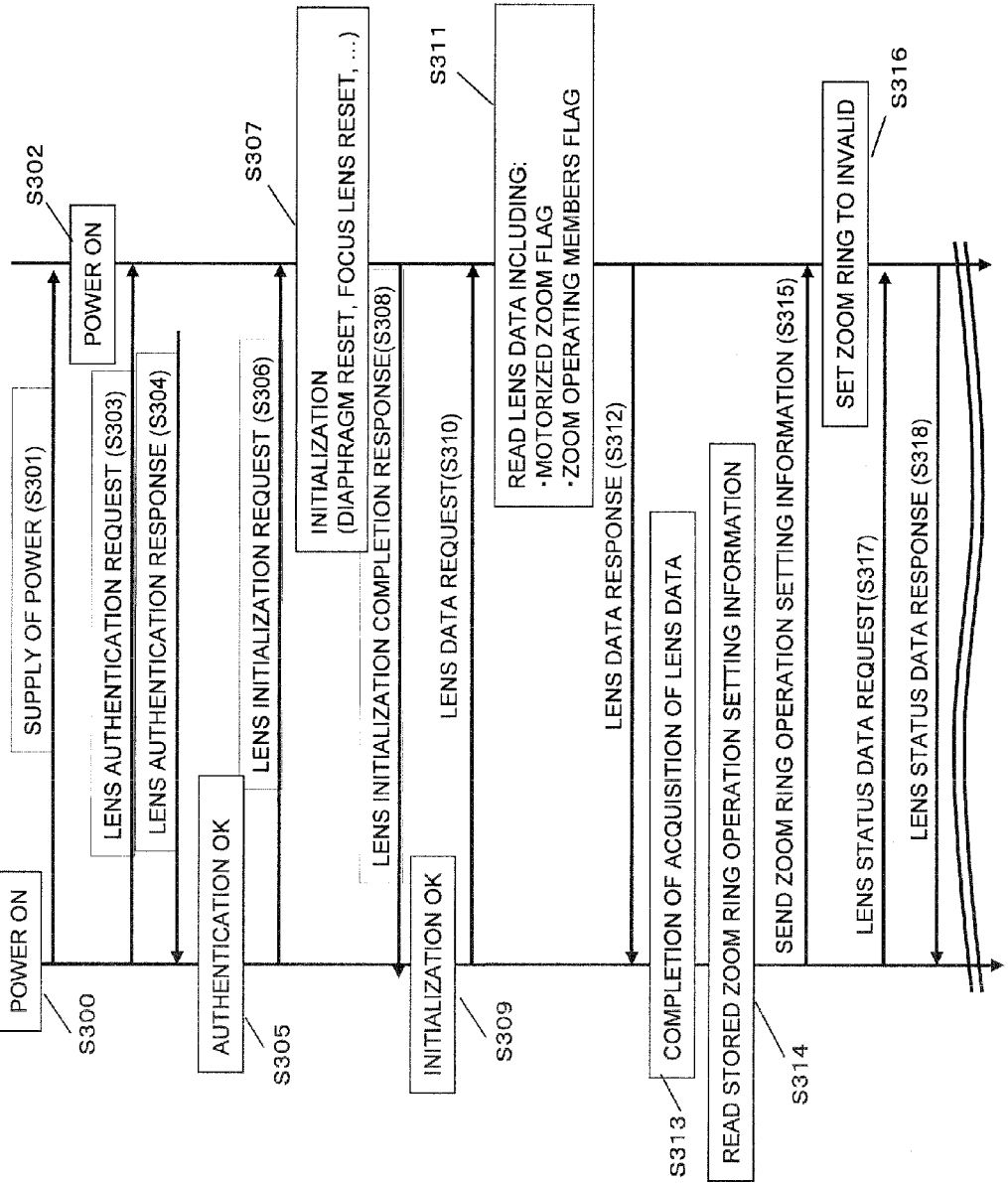
FIG. 5 is a flowchart showing an initial operation of the digital camera of the first embodiment.

2-2. Initial Operation Performed when the Motorized Interchangeable Lens is Mounted to the Camera Body Initial operation performed when the motorized interchangeable lens 101 is mounted to the camera body 102 will be described using FIG. 5. FIG. 5 is a sequence chart for an initial operation for imaging preparation at power-on of the digital camera 100. When a user turns on the power supply 154 of the camera body 102 with the motorized interchangeable lens 101 mounted to the camera body 102 (S300), the power supply 154 supplies power to the motorized interchangeable lens 101 through the body mount 140 and the lens mount 130 (S301). By this, power is supplied to each component of the motorized interchangeable lens 101 (S302).

Then, the camera controller 153 requests the lens controller 120 to send authentication information of the motorized interchangeable lens 101 (S303). The authentication information of the motorized interchangeable lens 101 includes information about whether the interchangeable lens has been mounted to the camera body 102 (e.g., whether the motorized interchangeable lens 101 is being mounted) and information about whether accessories are being attached to the motorized interchangeable lens 101. The lens controller 120 responds to the lens authentication request from the camera controller 153 (S304). By this, the camera controller 153 completes the lens authentication and can grasp whether the motorized interchangeable lens 101 is being mounted to the camera body 102 and whether accessories such as a teleconverter lens and a wide converter lens are being attached to the motorized interchangeable lens 101 (S305).

Then, the camera controller 153 requests the lens controller 120 to perform initialization operation (S306). In response to this, the lens controller 120 performs initialization operation such as resetting the focus lens 110, resetting the zoom lens 112, and resetting the diaphragm 116 (S307). The lens controller 120 sends a response indicating that the lens initialization operation has been completed, to the camera controller 153 (S308). By this, the camera controller 153 can grasp that the motorized interchangeable lens 101 has been initialized (S309).

Then, the camera controller 153 requests the lens controller 120 to send lens data (S310). The lens data is stored in the flash memory 122 of the motorized interchangeable lens 101.

In response to the lens data request from the camera controller 153, the lens controller 120 reads lens data from the flash memory 122 (S311). The lens controller 120 sends, as a response, the read lens data to the camera controller 153 (S312). The lens data includes characteristic values specific to the motorized interchangeable lens 101, such as lens name, F-number, zoom controllable range, focus controllable range, and information about operating members. In addition, the lens data includes information about whether the mounted interchangeable lens has a motorized zoom function (whether, in the mounted interchangeable lens, the zoom lens 112 is driven in a motorized manner by the zoom lens driver 113 rather than being driven in mechanical conjunction with user's operation). By the camera controller 153 obtaining information about whether the mounted interchangeable lens has the motorized zoom function and information about operating members (the types of operating members provided on the motorized interchangeable lens 101) from the lens controller 120, the camera controller 153 can grasp information about whether the mounted interchangeable lens has the motorized zoom function and about operating members. The motorized interchangeable lens 101 of the present embodiment includes two operating members relating to the motorized zoom function, the zoom ring 115 and the zoom lever 118. Therefore, the lens data includes, as information about operating members, information indicating that the motorized interchangeable lens 101 includes the zoom ring 115 and the zoom lever 118. If the camera body 102 supports motorized zoom, then the camera controller 153 can perform various controls for the motorized zoom of the motorized interchangeable lens 101. In addition, if the camera body 102 supports the operating members of the motorized interchangeable lens 101, then the camera controller 153 can perform control of whether to allow operation of the operating members provided on the mounted motorized interchangeable lens 101. By the above-described operation, the camera controller 153 completes obtaining of the lens data of the mounted motorized interchangeable lens 101 (S313).

If the camera controller 153 determines, from the obtained lens data, that the mounted interchangeable lens supports motorized zoom and has a plurality of operating members which can operate zoom magnification (in the present embodiment, the zoom ring 115 and the zoom lever 118), then the camera controller 153 operates in the following manner. Specifically, the camera controller 153 reads zoom ring operation setting information which is stored in the flash memory 156 and which is set by a user who has used the digital camera 100 last time (S314). The zoom ring operation setting information indicates a setting state as to whether to accept operation of the zoom ring 115 provided on the motorized interchangeable lens 101. The camera controller 153 notifies the motorized interchangeable lens 101 of the read zoom ring operation setting information (S315). In response to the notification of the zoom ring operation setting information from the camera body 102, the motorized interchangeable lens 101 sets operation of the zoom ring 115 to valid or invalid, according to the notification (S316). The example in FIG. 5 shows the case in which operation of the zoom ring 115 is set to invalid. In this case, even if the zoom ring 115 is operated by the user, the zoom lens 112 is not driven. The lens controller 120 stores the zoom ring operation setting information in the flash memory 122.

When the camera body 102 grasps the lens data of the motorized interchangeable lens 101 mounted thereto and the motorized interchangeable lens 101 completes the setting of whether to allow operation of the zoom operating member, the digital camera 100 goes into an imageable state. In this state, the camera controller 153 periodically requests the lens controller 120 to send lens state data representing the state of the motorized interchangeable lens 101 (S317). The lens state data includes, for example, information on the zoom focal length by the zoom lens 112, information on the position of the focus lens 110, information on the aperture value of the diaphragm 116, zoom ring operation information indicating that the zoom ring 115 has been operated, and zoom lever operation information indicating that the zoom lever 118 has been operated. The zoom ring operation information includes information on whether the rotation position of the zoom ring 115 has been changed, the current rotation position and rotation speed, and the like. In response to this request, the lens controller 120 sends, as a response, requested lens state data to the camera controller 153 (S318).

By the camera body 102 and the motorized interchangeable lens 101 performing requests for necessary data and responses thereto in the above-described manner, the camera body 102 and the motorized interchangeable lens 101 complete the initial operation.

2-3. Zoom Control Performed when Operation of the Zoom Ring is Set to Valid

Figure 6:
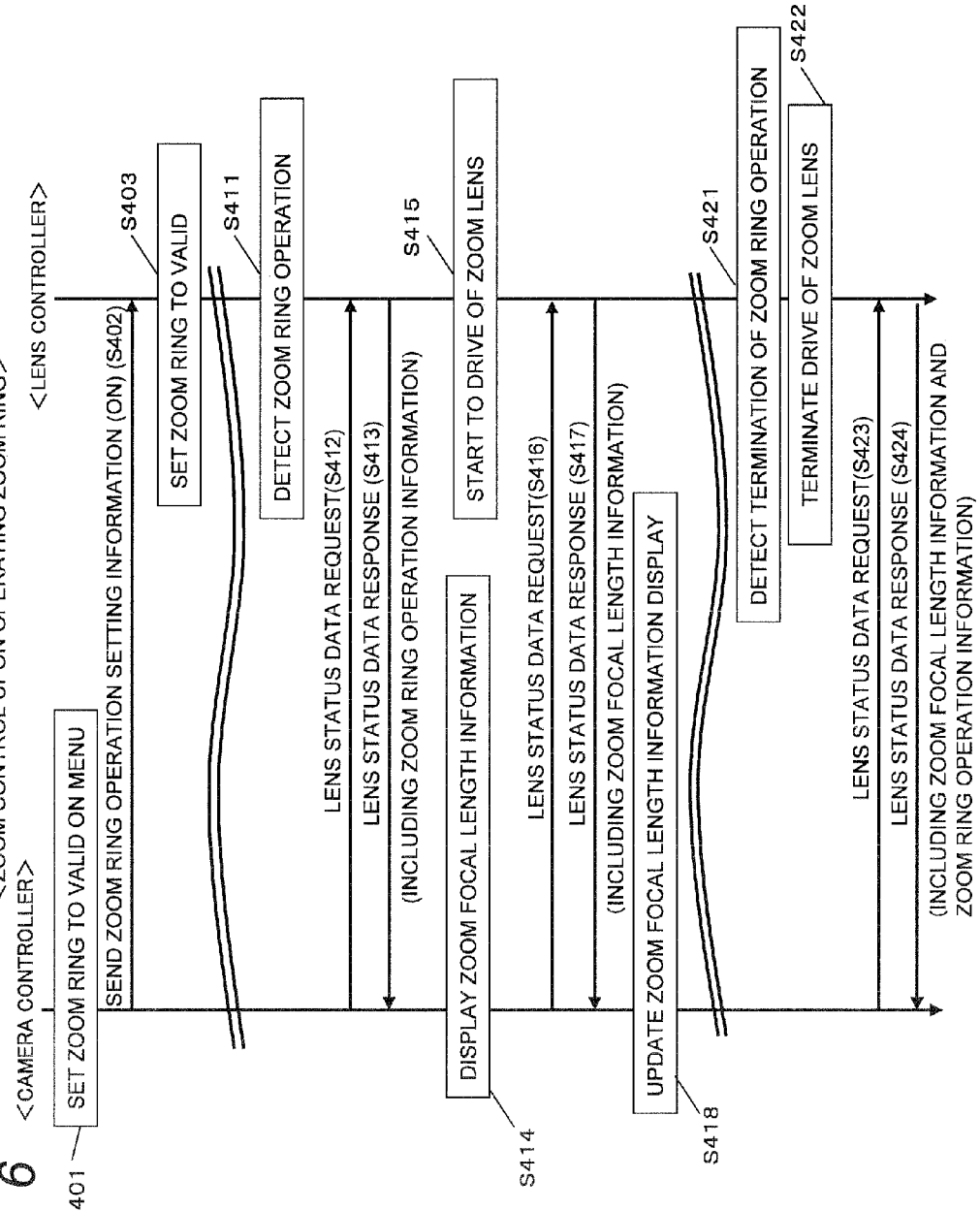
FIG. 6 is a flowchart showing a zoom operation performed when operation of a zoom ring is set to valid in the first embodiment.

Zoom control performed when the zoom ring 115 of the motorized interchangeable lens 101 is operated will be described. First, zoom control performed when operation of the zoom ring 115 is set to valid will be described. FIG. 6 is a sequence chart for zoom control performed when operation of the zoom ring 115 is set to valid and thereafter the zoom ring 115 is operated.

When a user of the digital camera 100 wants to perform zoom operation with the zoom ring 115 of the motorized interchangeable lens 101, the user sets operation of the zoom ring 115 to valid on a menu setting screen of the camera body 102 (the motorized zoom setting item L001 in FIG. 4B and the zoom ring operation setting item L002 in FIG. 4C). According to the user's operation on the menu setting screen, the camera controller 153 sets the zoom ring operation setting information to "on" (S401) and stores the information in the flash memory 156. Note that if operation of the zoom ring 115 is already set to valid, i.e., the zoom ring operation setting information is already set to "on", then this setting is not necessary. Then, the camera controller 153 notifies the motorized interchangeable lens 101 of the zoom ring operation setting information indicating "on" (S402). In response to the zoom ring operation setting information indicating "on" from the camera body 102, the lens controller 120 sets operation of the zoom ring 115 to valid (S403). The lens controller 120 stores the received zoom ring operation setting information in the flash memory 122.

When the user of the digital camera 100 operates the zoom ring 115 of the motorized interchangeable lens 101, the lens controller 120 detects this operation (S411). In response to a lens state data request periodically sent from the camera controller 153 (S412), the lens controller 120 sends, as a reply, lens state data including zoom ring operation information indicating that the zoom ring 115 has been operated (S413).

When the camera controller 153 recognizes, by the received zoom ring operation information, that the zoom ring 115 has been operated, the camera controller 153 determines a zoom ring operation acceptance allowed/not allowed setting state. Specifically, the camera controller 153 refers to the zoom ring operation setting information stored in the flash memory 156. Here, since the zoom ring operation setting information is "on", zoom focal length information 300 included in the zoom ring operation information is displayed on the liquid crystal monitor 163 (S414). The display of the zoom focal length information 300 is provided so that, as shown in FIG. 4D, the user can see the focal length which is determined by the position of the zoom lens 112. Instead of the display of the zoom focal length information 300, only the position of the zoom lens 112 may be displayed or zoom magnification which is determined by the focal length may be displayed.

On the other hand, when the zoom ring 115 is operated, the lens controller 120 determines a zoom ring operation acceptance allowed/not allowed setting state. Specifically, the lens controller 120 refers to the zoom ring operation setting information stored in the flash memory 122. Here, since the zoom ring operation setting information is "on", the lens controller 120 sends a drive control signal to the zoom lens driver 113 based on the rotation position of the zoom ring 115, to start the drive of the zoom lens 112 (S415). The camera controller 153 periodically requests lens state data even during the operation of the zoom ring 115 by the user (S416). The lens controller 120 sends, as a response, lens state data including zoom focal length information 300 (S417). At this time, since the zoom lens 112 is being driven, the zoom focal length information 300 included in the lens state data is updated. In response to the reception of the lens state data, the camera controller 153 updates the zoom focal length information display on the liquid crystal monitor 163, based on the updated zoom focal length information 300 (S418). As such, a lens state data request, a lens state data response, and an update to zoom focal length information display are repeated while the zoom lens 112 is being driven, and thus, the user of the digital camera 100 can grasp the drive state and focal length of the zoom lens 112 on the liquid crystal monitor 163.

When the zoom magnification of the motorized interchangeable lens 101 has reached a desired magnification, the user of the digital camera 100 terminates the operation of the zoom ring 115. When the lens controller 120 detects that the operation of the zoom ring 115 has been terminated (S421), the lens controller 120 immediately issues a stop instruction to the zoom lens driver 113 and thereby terminates the drive of the zoom lens 112 (S422).

In response to a lens state data request (S423) which is periodically made by the camera controller 153, the lens controller 120 sends, as a response, lens state data including zoom focal length information 300 indicating the position in which the zoom lens 112 is finally stopped and zoom ring operation information indicating that the operation of the zoom ring 115 has been terminated (S424).

2-4. Zoom Control Performed when Zoom Ring Operation is Set to Invalid

Figure 7:
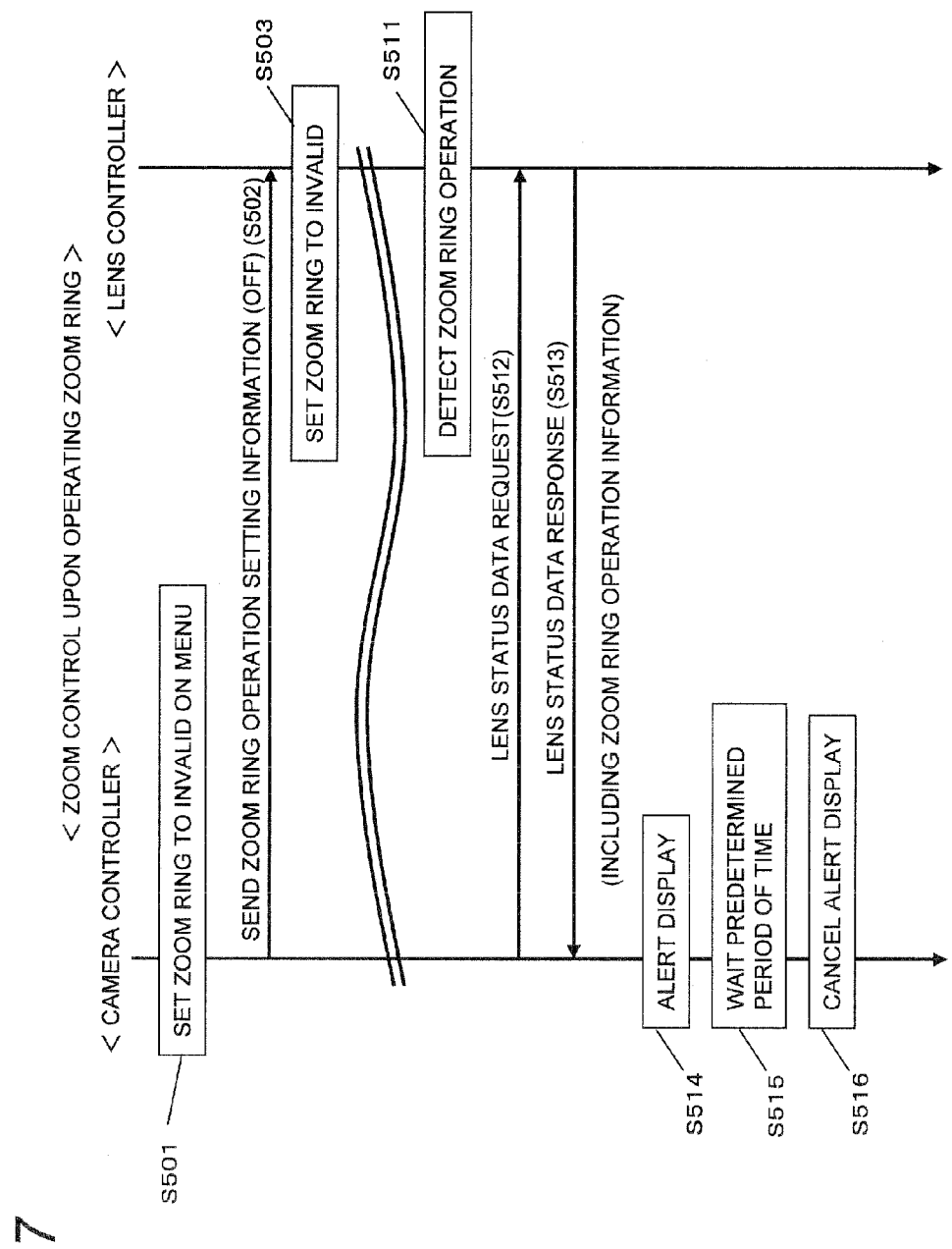
FIG. 7 is a flowchart showing a zoom operation performed when operation of the zoom ring is set to invalid in the first embodiment.

Zoom control performed when operation of the zoom ring 115 is set to invalid will be described. FIG. 7 is a sequence chart for zoom control performed when operation of the zoom ring 115 is set to invalid and thereafter the zoom ring 115 is operated.

When a user of the digital camera 100 wants to prohibit zoom operation by the zoom ring 115 of the motorized interchangeable lens 101, the user sets operation of the zoom ring 115 to invalid on a menu setting screen of the camera body 102 (the motorized zoom setting item L001 in FIG. 4B and the zoom ring operation setting item L002 in FIG. 4C). According to the operation on the menu setting screen, the camera controller 153 sets the zoom ring operation setting information to "off" (S501) and stores the information in the flash memory 156. Note that if the operation of the zoom ring 115 is already set to invalid, i.e., the zoom ring operation setting information is already set to "off", then this setting is not necessary. Then, the camera controller 153 notifies the motorized interchangeable lens 101 of the zoom ring operation setting information indicating "off" (S502). In response to the zoom ring operation setting information indicating "off" from the camera body 102, the lens controller 120 sets operation to be performed on the zoom ring 115 to invalid (S503). The lens controller 120 stores the zoom ring operation setting information in the flash memory 122.

When the user of the digital camera 100 operates the zoom ring 115 of the motorized interchangeable lens 101 (S511), in response to a lens state data request which is periodically made (S512), the lens controller 120 sends, as a reply, lens state data including zoom ring operation information indicating that the zoom ring 115 has been operated (S513). At this time, the lens controller 120 determines a zoom ring operation acceptance allowed/not allowed setting state. Specifically, the lens controller 120 refers to the zoom ring operation setting information stored in the flash memory 122. Here, since the zoom ring operation setting information is "off", the lens controller 120 does not send a drive control signal according to the operation of the zoom ring 115, to the zoom lens driver 113. That is, despite the fact that the operation has been performed on the zoom ring 115 by the user, the zoom lens 112 is not driven.

On the other hand, when the camera controller 153 recognizes, by the zoom ring operation information, that the zoom ring 115 has been operated, the camera controller 153 determines a zoom ring operation acceptance allowed/not allowed setting state. Specifically, the camera controller 153 refers to the zoom ring operation setting information stored in the flash memory 156. Here, since the zoom ring operation setting information is "off", the camera controller 153 provides alert display indicating that operation to be performed on the zoom ring 115 is set to invalid, on the liquid crystal monitor 163 (S514). When the alert display is provided on the liquid crystal monitor 163 for a predetermined period of time (S515), the camera controller 153 cancels the alert display provided on the liquid crystal monitor 163 and brings back the original display (S516).

Note that, in the present embodiment, operation to be performed on the zoom lever 118 by the user is always allowed to be accepted regardless of whether operation of the zoom ring 115 is set to valid or invalid, and the zoom lens 112 is driven according to operation of the zoom lever 118. Therefore, in the case in which operation to be performed on the zoom ring 115 is valid, when either the zoom ring 115 or the zoom lever 118 is operated, the lens controller 120 drives the zoom lens 112 according to each operation. Note, however, that when both are simultaneously operated, control may be performed such that only the operation performed on either one (e.g., the zoom ring 115) is validated and the operation performed on the other one (e.g., the zoom lever 118) is invalidated. A sequence for zoom control performed when the zoom lever 118 is operated is the same as that for zoom control for operation of the zoom ring 115 which is described using FIG. 6, and thus, a detailed description is omitted.

3. Summary

In a digital camera 100 of the first embodiment, a motorized interchangeable lens 101 includes a plurality of operating members for driving a zoom lens 112 (specifically, a zoom ring 115 and a zoom lever 118), a camera body 102 sets setting information for indicating valid/invalid state of at least one of the plurality of operating members (specifically, the zoom ring 115) based on user's operation, and the motorized interchangeable lens 101 controls a zoom lens driver 113 based on the setting information. By this, for example, when a user wants to adjust zoom magnification by operating the zoom lever 118, by setting operation of the zoom ring 115 to invalid, when the user accidentally touches and rotates the zoom ring 115 during the operation of the zoom lever 118, the zoom magnification can be prevented from being unintentionally changed.

Other Embodiments

The present embodiment is not limited to the first embodiment and various embodiments are considered. Other embodiments will be described below.

(1) In the first embodiment, when the zoom ring 115 is operated with operation of the zoom ring 115 set to invalid, an alert indicating that operation to be performed on the zoom ring 115 is invalid is displayed on the liquid crystal monitor 163, regardless of the degree of operation of the zoom ring 115. However, display/non-display of an alert may be switched according to the degree of operation of the zoom ring 115. For example, when the zoom ring 115 is operated with operation of the zoom ring 115 set to invalid, the camera body 102 may display an alert indicating that operation to be performed on the zoom ring 115 is invalid, on the liquid crystal monitor 163 when the degree of the operation of the zoom ring 115 exceeds a predetermined threshold value. The expression "the degree of the operation of the zoom ring 115 exceeds a predetermined threshold value" refers to, for example, that a period of time during which the zoom ring 115 is continuously operated exceeds a predetermined period of time or that the amount of a single operation (the amount of a single rotation) performed on the zoom ring 115 exceeds a predetermined amount. When the user accidentally touches the zoom ring 115, the operation time is a very short time which is less than a threshold value or the amount of operation is a very small amount which is less than a threshold value. In such a case, alert display indicating "invalid" is not provided. Hence, shooting is not interrupted by alert display. On the other hand, when the user operates the zoom ring 115 due to a misunderstanding that the zoom operation by the zoom ring 115 is allowed, the operation time or the amount of rotation exceeds the threshold value, and thus, an alert display indicating that operation to be performed on the zoom ring 115 is invalid is provided. This can make the user aware of his/her misunderstanding.

(2) In the first embodiment, when operation of the zoom ring 115 is set to invalid, even if the zoom ring 115 is operated, the drive of the zoom lens 112 is not performed. However, even when operation of the zoom ring 115 is set to invalid, if the degree of operation performed on the zoom ring 115 is relatively large, then the drive of the zoom lens 112 may be performed. For example, when the zoom ring 115 is operated with operation of the zoom ring 115 set to invalid, the lens controller 120 monitors its operation conditions and determines the operation time and amount of operation of the zoom ring 115. When the operation time or amount of operation of the zoom ring 115 exceeds a predetermined threshold value, even if operation to be performed on the zoom ring 115 is set to invalid, the zoom lens driver 113 is controlled to drive the zoom lens 112 according to the operation performed on the zoom ring 115, to change zoom magnification. At this time, the drive of the zoom lens 112 is not performed until the operation time or the amount of operation exceeds the threshold value, but once it is determined that the operation time or the amount of operation exceeds the threshold value, the lens controller 120 determines an amount of rotation of the zoom ring 115, going back to when the operation performed on the zoom ring 115 has started, and drives the zoom lens 112 according to the amount of rotation. By doing this, when the user operates the zoom ring 115 to a large extent, zoom magnification can be changed correspondingly. Specifically, even when operation of the zoom ring 115 is set to invalid, if the user operates the zoom ring 115 intentionally, then zoom magnification can be changed. On the other hand, when the user touches the zoom ring 115 unintentionally, since the operation time or the amount of operation is small, the operation time or the amount of operation does not exceed a predetermined threshold value. Hence, the zoom lens 112 is not driven and thus zoom magnification is not changed. By this, when the user touches the zoom ring 115 unintentionally, zoom magnification can be prevented from being changed.

(3) In the first embodiment, the case is described in which only the motorized interchangeable lens 101 includes operating members configured to drive the zoom lens 112. Specifically, a configuration is described in which operation of the zoom ring 115 can be invalidated when the motorized interchangeable lens 101 includes two operating members for zoom operation (the zoom ring 115 and the zoom lever 118). However, an operating member capable of driving the zoom lens 112 may be provided not only on the motorized interchangeable lens 101 but also on the camera body 102. In such a case, the ideas of the above-described embodiment may be applied. Specifically, when the camera body 102 includes an operating member capable of performing zoom operation, the operating members provided on the motorized interchangeable lens 101 may be set to invalid.

For example, the motorized interchangeable lens 101 includes one or a plurality of operating members for zoom operation (the zoom ring 115 and/or the zoom lever 118). On the other hand, when the camera body 102 detects that a motorized interchangeable lens capable of performing motorized zoom has been mounted thereto, the camera body 102 assigns a function of serving as an operating member for zoom operation to the camera-side operating unit 170 or the touch panel 162 which is provided on the camera body 102. This can be implemented by, for example, the following configuration. The left and right buttons of the cross button 205 are assigned for zoom operation, and the camera controller 153 notifies the lens controller 120 of information for changing zoom magnification, according to the pressing of the left and right buttons. The lens controller 120 controls the zoom lens driver 113 based on the information. By this, the zoom magnification of the motorized interchangeable lens 101 can be changed according to the operation performed on the camera body 102.

In such a configuration, the camera body 102 can further set whether operation to be performed on the operating members provided on the mounted motorized interchangeable lens 101 is validated or invalidated. By this, when the digital camera 100 as a whole has a plurality of operating members for zoom operation, the operating members provided on the motorized interchangeable lens 101 can be validated or invalidated. For example, it is also possible that all of the operating members provided on the motorized interchangeable lens 101 are invalidated and zoom operation of the motorized interchangeable lens 101 is allowed only by operation performed on the camera body 102. By invalidating the operating members of the motorized interchangeable lens 101, for example, zoom magnification can be prevented from being unintentionally changed due to the user simply and accidentally touching the operating members when performing shooting with the motorized interchangeable lens 101 held with a hand.

(4) In the first embodiment, a configuration is described in which operation of the zoom ring 115 is invalidated according to the setting made by the user. However, the valid/invalid operation states of the zoom ring 115 may be dynamically switched according to the operating state of the digital camera 100. Specifically, for example, operation of the zoom ring 115 may be set to invalid when moving image shooting is performed, and operation of the zoom ring 115 may be set to valid in other states. The moving image shooting as used herein indicates the operation of recording, as a moving image, a series of image information captured by the CMOS image sensor 150. For example, in shooting mode, moving image shooting starts when a moving image button (not shown) provided on the camera body 102 or the motorized interchangeable lens 101 is pressed, and ends when the moving image button is pressed again during the moving image shooting. During the moving image shooting, the CMOS image sensor 150 performs capturing at a predetermined frame rate (e.g., 30 frames/second) and outputs image information every capturing operation. The camera controller 153 performs a compression and encoding process on these pieces of image information in MPEG format, and the like, and records the image information in the memory card 164, as a moving image. The digital camera 100 invalidates operation of the zoom ring 115 during the moving image shooting.

Specifically, when moving image shooting starts by detecting pressing of the moving image button by the user, the camera controller 153 stores, in the flash memory 156, zoom ring operation setting information indicating "off" and notifies the motorized interchangeable lens 101 of the information. In response to the zoom ring operation setting information from the camera body 102, the lens controller 120 sets operation by the zoom ring 115 to invalid. The lens controller 120 stores the zoom ring operation setting information in the flash memory 122. When the moving image shooting ends by detecting pressing of the moving image button by the user, the camera controller 153 stores, in the flash memory 156, zoom ring operation setting information indicating "on" and notifies the motorized interchangeable lens 101 of the information. In response to the zoom ring operation setting information indicating "on" from the camera body 102, the lens controller 120 sets operation to be performed on the zoom ring 115 to valid. The lens controller 120 stores the zoom ring operation setting information in the flash memory 122. During moving image shooting, by performing the same operation as the operation performed when the zoom ring 115 is invalid which is described with reference to FIG. 7, operation to be performed on the zoom ring 115 is invalidated.

Note that operation of the zoom ring 115 may be invalidated while the digital camera 100 is performing moving image shooting, and in other states the valid/invalid of the zoom ring 115 may be set according to the setting made by the user. This can be implemented as follows. Upon starting moving image shooting, the camera controller 153 reads zoom ring operation setting information from the flash memory 156 and saves the zoom ring operation setting information in a different area (e.g., in the flash memory 156, an area different from an area for storing the zoom ring operation setting information). Thereafter, the camera controller 153 notifies the motorized interchangeable lens 101 of zoom ring operation setting information indicating "off". Upon ending the moving image shooting, the camera controller 153 reads the zoom ring operation setting information saved earlier in the different area, and notifies the motorized interchangeable lens 101 of the content of the read information as zoom ring operation setting information.

(5) In the first embodiment, the valid/invalid state of an operating member (the zoom ring 115) is determined based on the setting made by the user. However, the valid/invalid state of the operating member may be set by the camera body 102 according to the orientation of the digital camera 100. For example, the horizontal and vertical sensor 166 of the camera body 102 detects whether the orientation of the camera body 102 is a vertical orientation or a horizontal orientation, and sends the detected orientation to the camera controller 153. When the detected orientation of the camera body 102 is a horizontal orientation (an erect state), the camera controller 153 sets the operating member of the motorized interchangeable lens 101 to valid. On the other hand, when the detected orientation of the camera body 102 is a vertical orientation, the camera controller 153 sets the operating member(s) (the zoom ring 115 and/or the zoom lever 118) of the motorized interchangeable lens 101 to invalid. When the operating member(s) of the motorized interchangeable lens 101 is (are) set to invalid, the drive of the zoom lens driver 113 by the operating members of the camera body 102 (e.g., the camera-side operating unit 170 and the touch panel 162) is allowed.

This is because when the camera body 102 is in a vertical orientation, the operating members provided on the motorized interchangeable lens 101 may be difficult for the user to operate and thus it may be considered that using the operating members of the camera body 102 provides improved ease of operation to the user.

(6) In the first embodiment, a configuration is described in which whether to validate or invalidate operation to be performed on the zoom ring 115 can be set. However, whether to validate or invalidate the zoom lever 118 instead of the zoom ring 115 may be allowed to be set. Alternatively, valid or invalid may be allowed to be set for each of the zoom ring 115 and the zoom lever 118.

(7) In the first embodiment, although the case of driving the zoom lens 112 is described, the above-described first embodiment and other embodiments can also be applied to the case of driving other members. For example, the case of driving the focus lens 110 is also acceptable. Specifically, when a plurality of operating members for driving the focus lens 110 (e.g., a focus ring and a focus lever) are provided on the motorized interchangeable lens 101, the valid/invalid of operation of at least one of the operating members (e.g., the focus ring) may be allowed to be set. The focus ring is an operating member provided on the exterior of the motorized interchangeable lens 101. The focus ring is configured to rotate relatively to the motorized interchangeable lens 101. The rotation position and rotation speed of the focus ring are detected by a detector (not shown) and notified to the lens controller 120. The lens controller 120 supplies a drive control signal to the focus lens driver 111, based on the notified rotation position and rotation speed of the focus ring. The focus lever is an operating member provided on the exterior of the motorized interchangeable lens 101. The focus lever consists of, for example, a three-position toggle switch (SW) as with the zoom lever 118. When the lens controller 120 detects that the focus lever has been moved, the lens controller 120 supplies a drive control signal to the focus lens driver 111, based on a direction in which the focus lever has been moved.

The ideas disclosed in the above-described first embodiment and other embodiments can be appropriately combined by those skilled in the art.

Although in the above-described embodiments the digital camera 100 is exemplified as an example of an imaging apparatus, the above ideas are not limited to the application to digital cameras. The above ideas can be applied to interchangeable lens type imaging apparatuses including an interchangeable lens having a zoom function, such as movie cameras and mobile phones with a camera.

INDUSTRIAL APPLICABILITY

The above embodiments can be applied to interchangeable lens type imaging apparatuses including an interchangeable lens having a zoom function, such as digital cameras, movie cameras, and mobile phones with a camera.

What is claimed is:

1. An interchangeable lens mountable to a camera body, comprising:
    a zoom lens configured to adjust an angle of view of a subject image;
    a driver configured to move the zoom lens in an optical axis direction;
    a first operating member configured to generate an operation signal used to drive the driver according to an operation performed by a user;
    a second operating member configured to generate an operation signal used to drive the driver according to an operation performed by the user;
    a communication unit configured to receive, from the camera body, setting information for setting at least one of the first and second operating members in a valid state or an invalid state; and
    a controller configured to control the driver, wherein:
    the controller:
        sets at least one of the first and second operating members in the invalid state or the valid state based on the setting information received by the communication unit,
        drives the driver based on the operation signal generated from the operating member having been set to the valid state or having not been set to the invalid state, and
        does not drive the driver based on the operation signal generated from the operating member having been set to the invalid state.

2. The interchangeable lens according to claim 1, wherein when the operating member having been set to the invalid state by the setting information is operated by the user and an operation time or an amount of the operation by the user exceeds a predetermined value, the controller drives the driver based on the operation signal generated from the operating member having been set to the invalid state.

3. The interchangeable lens according to claim 1, wherein when the communication unit receives the operation signal for driving the driver from the camera body, the controller controls the driver based on the operation signal received from the camera body.

4. A camera body to which an interchangeable lens is mountable, the interchangeable lens including a first operating member configured to drive a zoom lens and a second operating member configured to drive the zoom lens, the camera body comprising:
    an imaging unit configured to capture a subject image inputted through the interchangeable lens to generate image data;
    a setting unit configured to set setting information for setting at least one of the first and second operating members of the interchangeable lens in a valid state or an invalid state; and
    a communication unit configured to send the setting information to the interchangeable lens.

5. The camera body according to claim 4, further comprising a camera body operating member configured to accept an operation from a user, wherein
    the setting unit sets the setting information based on the operation of the camera body operating member by the user.

6. The camera body according to claim 4, wherein the setting unit sets the setting information according to an operating state of the camera body.

7. The camera body according to claim 6, wherein
    one of the first and second operating members of the interchangeable lens is a zoom ring configured to generate an operation signal used to drive the zoom lens according to a rotation operation, and
    the setting unit sets the zoom ring to the invalid state when the operating state of the camera body is a moving image shooting state.

8. The camera body according to claim 4, further comprising a sensor configured to detect an orientation of the camera body, wherein the setting unit sets the setting information according to the orientation of the camera body detected by the sensor.

9. The camera body according to claim 4, further comprising a camera body operating member configured to generate an operation signal used to drive the zoom lens based on an operation performed by a user, wherein
the communication unit sends the operation signal generated by the camera body operating member to the interchangeable lens.

10. The camera body according to claim 4, further comprising:
a display unit configured to display predetermined information; and
a controller configured to control the display unit, wherein when the communication unit receives, from the interchangeable lens, information about an operation performed by a user on the operating member having been set to the invalid state by the setting information, the controller allows the display unit to display information indicating that the operating member operated by the user is set to the invalid state.

11. The camera body according to claim 10, wherein when information about an operation performed by the user on the operating member having been set to the invalid state by the setting information is received from the interchangeable lens, the display unit displays information indicating that the operating member operated by the user is set to the invalid state only if an operation time or an amount of the operation by the user exceeds a predetermined value.

12. An interchangeable lens mountable to a camera body, comprising:
a lens disposed along an optical axis;
a driver configured to move the lens in a direction along the optical axis;
a first operating member configured to generate an operation signal used to drive the driver according to an operation performed by a user;
a second operating member configured to generate an operation signal used to drive the driver according to an operation performed by the user;
a communication unit configured to receive, from the camera body, setting information for setting at least one of the first and second operating members in a valid state or an invalid state; and
a controller configured to drive the driver in response to the operation signal generated by the operating member having been set in the valid state or having not been set in the invalid state, and to not drive the driver in response to the operation signal generated by the operating member having been set in the invalid state.

13. The interchangeable lens according to claim 12, wherein one of the first and second operating members is a ring configured to be rotated by the user and the other of the first and second operating members is a switch configured to be switched to plural positions by the user.

14. The interchangeable lens according to claim 12, wherein the lens is a focus lens or a zoom lens.

* * * * *